United States Patent [19]
Forster

[11] Patent Number: 5,391,123
[45] Date of Patent: Feb. 21, 1995

[54] HYDROMECHANICAL FINAL DRIVE

[75] Inventor: Franz Forster, Karlstadt-Muhlbach, Germany

[73] Assignee: Linde Aktiengesellschaft, Germany

[21] Appl. No.: 23,928

[22] Filed: Feb. 26, 1993

[30] Foreign Application Priority Data

Feb. 27, 1992 [DE] Germany .................. 4206087

[51] Int. Cl.⁶ ................................ F16H 47/04
[52] U.S. Cl. ........................................ 475/83
[58] Field of Search ........................ 475/31, 83

[56] References Cited

U.S. PATENT DOCUMENTS

| | | | |
|---|---|---|---|
| 4,029,166 | 6/1977 | Haak et al. | 475/83 X |
| 4,275,616 | 6/1981 | Ehrlinger et al. | 475/83 OR |
| 4,583,425 | 4/1986 | Mann et al. | 475/83 OR |
| 5,107,718 | 4/1992 | Inagawa | 475/83 X |

FOREIGN PATENT DOCUMENTS 1335666 10/1973 United Kingdom .

Primary Examiner—Dirk Wright
Attorney, Agent, or Firm—Webb Ziesenheim Bruening Logsdon Orkin & Hanson

[57] ABSTRACT

A hydromechanical drive having a fixed hub support and a rotary hub, a hydrostatic swash-plate type axial piston motor and a planetary gear connected to the output side of the rotary hub. A control surface is formed on the hub support and pressure medium conduits are formed in the hub support and open on the control surface to provide pressurized hydraulic fluid to the axial piston motor. A cylindrical machine part surrounds the cylindrical drum of the axial piston motor and is non-rotatably connected to the rotary hub. A bearing is located between the inner surface of the rotary hub and the outer surface of the hub support to absorb forces from the axial piston motor and from outside the drive.

17 Claims, 1 Drawing Sheet

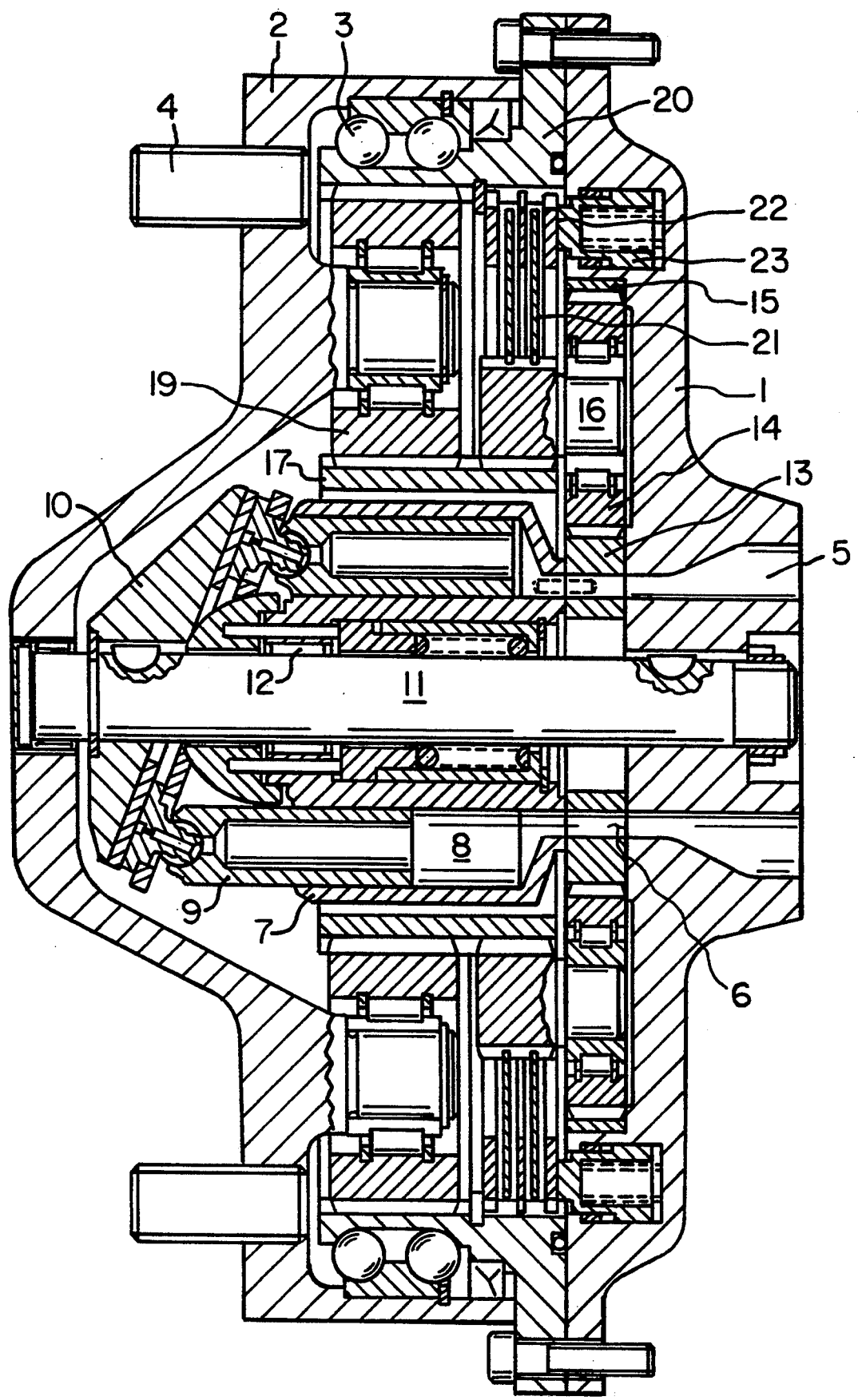

HYDROMECHANICAL FINAL DRIVE

BACKGROUND OF THE INVENTION

1. Field of the Invention

The invention relates to a hydromechanical final drive, having a fixed hub support, a rotating hub, and a hydrostatic swash-plate type axial piston motor located including at least a single stage planetary gear connected on the output side to the rotating hub. The axes of rotation of the rotating hub, the planetary gear and the cylindrical drum of the axial piston motor coincide and the pressure medium conduits leading to the work cylinders of the cylindrical drum of the axial piston motor open onto a control surface forming a part of the fixed hub support or onto a separate component which is attached to the fixed hub support.

2. Description of Related Prior Art

U.S. Pat. No. 4,583,425 discloses an axial piston motor with a downstream planetary gear which is the final drive for a vehicle and is incorporated herein by reference. The axial piston motor is partly integrated into the planetary gear. The cylindrical drum and the swash plate of the axial piston motor, as well as the housing encircling them, are all located in a cavity within the pinion cage of the last stage of the planetary gear so that the axial dimension is smaller than that of other such final drives.

SUMMARY OF THE INVENTION

The object of the present invention is to provide a final drive having a small size and a relatively small number of individual parts.

To achieve this object, the invention includes a planetary gear concentric to and located within the longitudinal dimension of the axial piston motor. The planetary gear includes a cylindrical machine part surrounding the cylindrical drum of the axial piston motor. The cylindrical machine part drives the rotary hub and is either directly or indirectly connected to it. The cylindrical drum of the axial piston motor is non-rotatably connected directly to a drive shaft and to a rotating gear element of the planetary gear, and is supported by a bearing located between the rotary hub and the hub support which is intended to absorb both the forces of the axial piston motor and the outside forces affecting the final drive. The essential idea of the invention is to radially position the planetary gear over the axial piston motor to obtain a relatively short axial dimension and to provide a common bearing for the axial piston motor and the rotary hub. The invention also provides a final drive having fewer parts than prior art hydromechanical final drives.

In the invention sun gear of the planetary gear is the rotating gear and the ring gear is either attached to the hub support or formed integral with the inner surface of the hub support. The web is connected to the cylindrical machine part. It is, therefore, possible to form the sun gear directly on the outer circumference of the cylindrical drum. However, it is advantageous if the sun gear is located axially between the end of the cylindrical drum facing the control surface and the control surface and has openings therethrough for connecting the work cylinders in the cylindrical drum with the pressure medium conduits opening on the control surface. The diameter of the sun gear is thus maintained small which reduces the size of the planetary gear and, hence, the final drive.

The reduction ratio between the rotation speed of the cylindrical drum and the rotation speed of the rotary hub is increased by connecting a cylindrical machine part to the sun gear of a second stage of the planetary gear or casting this element integrally with the sun gear. The ring gear of the second stage is connected to the hub support and the web of the second stage is connected to the rotary hub. The pivots on which the planetary wheels are mounted are advantageously cast on the inside of the rotary hub.

According to the invention, the swash plate is fastened to or formed integrally with a tie rod and the tie rod is connected to the rotary hub in such a manner that it does not rotate in the area of the control surface. A bearing is located between the tie rod and the rotary hub in the area of the swash plate. Compared to a motor-side driven shaft, as used in final drives of the prior art and which generally has a wedge or teeth for a non-positive connection to the cylindrical drum, a tie rod is easier to fabricate and install. The design of the bearing between the tie rod and the rotary hub is simple since the rotational speed of the rotary hub is low compared to that of the tie rod. For example, at a maximum cylindrical drum rotational speed of 2000 rpm and a reduction in the planetary gear of 10:1, the rotary hub only rotates at 200 rpm so that a simple friction bearing can be used. The forces created because the work pistons rest on the swash plate and by the hydraulic relief at the control surface are absorbed on one side of the cylindrical drum by the sun gear of the first stage of the planetary gear and by the planetary gears in the ring gear and thus are transferred to the hub support. According to a refinement of the final drive according to the invention, the cylindrical drum is mounted on the end of the tie rod axially spaced from the control surface. Support of the cylindrical drum spaced from the sun gear is thus provided by the tie rod and an intermediate bearing, which may be a roller bearing. Because the tie rod is mounted in the rotating hub, the forces of the axial piston motor are passed to the bearing mounted between the rotary hub and the hub support.

An additional advantage of the invention is that a brake is located within the final drive. The brake has at least one brake plate non-rotatably connected to the web of the first stage of the planetary gear hub support. The brake plate may contact at least one brake plate which is non-rotatably connected to the hub support.

The configuration of the final drive according to the invention described above provides three functions; drive by the cylindrical drum of the axial piston motor; reduction by the planetary gear; and braking by plates which are radially superimposed on one another, and the axial length of the axial piston motor is not substantially exceeded. The invention provides a compact final drive which requires relatively few components which are easily manufactured and easily installed.

An additional advantageous aspect of the invention is that the bearing between the hub support and the rotary hub is a double-row annular ball bearing type which can absorb the outside forces affecting the final drive and the forces created by the axial piston motor.

A complete understanding of the invention will be obtained from the following description when taken in connection with the accompanying drawings wherein like reference characters identify like parts throughout.

BRIEF DESCRIPTION OF THE DRAWING

The drawing is a longitudinal section through a hydromechanical final drive according to the invention.

DESCRIPTION OF THE PREFERRED EMBODIMENT

The hydromechanical final drive shown in the drawing has a hub support 1, which may be fastened, for example, to the axle of a vehicle such as a mobile excavator. A rotary hub 2 is mounted on a bearing 3, which in this example is a double-row annular ball bearing, for rotation on hub support 1. Rotary hub 2 has studs 4 for connecting it to a wheel rim. Pressure medium conduits 5 are formed in hub support 1 and open on a control surface 6 of the axial piston motor which is located within the final drive. Control surface 6 has kidney-shaped control slots which enable periodic contact between work cylinders 8 located in a cylindrical drum 7 of the axial piston motor and pressure medium conduits 5. Control surface 6 may also be formed by a control floor which is connected to hub support 1. In the arrangement shown in the drawing, the face of hub support 1 functions as the control floor.

Work pistons 9 are located in work cylinders 8 in cylindrical drum 7 and an end of each piston 9 is operatively connected to a swash plate 10. Swash plate 10 is connected to a tie rod 11 which is non-rotatably connected to hub support 1. It is also possible to cast swash plate 10 and tie rod 11 as a single unit. Because cylindrical drum 7 rotates, a roller bearing 12 is located between the interior surface of cylindrical drum 7 and the exterior surface of the tie rod adjacent to swash plate 10.

Cylindrical drum 7 has a reduced diameter in the region adjacent to control surface 6 and is non-rotatably connected to a sun gear 13 in the first stage of a two-stage planetary gear. Sun gear 13 is located between the end surface of cylindrical drum 7 and control surface 6 and supports the reduced end of cylindrical drum 7.

Sun gear 13 meshes with planetary gears 14, which are mounted on a web 16 and which roll within a ring gear 15 which is connected to or formed integrally with hub support 1. Web 16 is located on a cylindrical machine part 17, which has either wedged teeth or notched teeth on its outer surface and surrounds cylindrical drum 7. The cylindrical machine part 17 thus forms the sun gear of the second stage of the planetary gear. The web of the second stage is formed by rotary hub 2, which has pivots 18 which mount planetary wheels 19. The planetary gears 19 mesh with a ring gear 20, which is connected to hub support 1. Bearing 3 is located between the outer surface of ring gear 20 and an inner surface of rotary hub 2.

The teeth on the outer surface of web 16 non-rotatably support axially movable brake plates 21. Brake plates 22 are mounted on hub support 1 and are positioned between brake plates 21. The brake plates 21 and 22 are moved axially by spring-loaded and hydraulically relieved brake pistons 23 which are located in hub support 1.

While a specific embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

I claim:

1. A hydromechanical final drive having a fixed hub support with a cylindrical outer surface and an annular rotary hub with a cylindrical inner surface and an output side, a hydrostatic swash-plate type axial piston motor having a cylindrical drum with an outer surface and an inner surface, a plurality of work cylinders located within said cylindrical drum and a work piston located in each of said plurality of work cylinders, a planetary gear having an axial length located within the axial length of said piston motor and connected to the output side of said rotary hub, said planetary gear and said cylindrical drum being coaxial, a control surface formed on said fixed hub support, pressure medium conduits formed in said fixed hub support and having outlets opening on said control surface and in flow connection with said plurality of work cylinders in said cylindrical drum, a cylindrical machine part surrounding said outer surface of said cylindrical drum and non-rotatably connected to said rotary hub, whereby said cylindrical drum is non-rotatably connected directly to said cylindrical machine part, and a bearing located between said cylindrical inner surface of said rotary hub and said cylindrical outer surface of said fixed hub support for absorbing forces of said axial piston motor and outside forces affecting the final drive.

2. A hydromechanical final drive as set forth in claim 1, including a sun gear in said planetary gear, a ring gear connected to said fixed hub support, and a web connected to said cylindrical machine part.

3. A hydromechanical final drive as set forth in claim 2, wherein said cylindrical drum has an end surface axially spaced from said control surface and said sun gear is located axially between said end surface of said cylindrical drum facing said control surface and said control surface, and a plurality of spaced openings formed in said sun gear for periodically connecting said outlets of said pressure medium conduits in said control surface with said plurality of work cylinders in said cylindrical drum.

4. A hydromechanical final drive as set forth in claim 3, wherein said cylindrical machine part is the sun gear of a second stage of said planetary gear, a ring gear in said second stage of said planetary gear connected to said fixed hub support, and said second stage of said planetary gear including a web connected to said rotary hub.

5. A hydromechanical final drive as set forth in claim 3, including a tie rod having an outer surface and extending through and coaxial with said cylindrical drum, a swash plate connected to said tie rod, means for non-rotatably connecting said tie rod to said fixed hub support in the area of said control surface, and a bearing located between said outer surface of said tie rod and said inner surface of said cylindrical drum adjacent to said swash plate.

6. A hydromechanical final drive as set forth in claim 4, including a tie rod having an outer surface and extending through and coaxial with said cylindrical drum, a swash plate connected to said tie rod, means for non-rotatably connecting said tie rod to said fixed hub support in the area of said control surface, and a bearing located between said outer surface of said tie rod and said inner surface of said cylindrical drum adjacent to said swash plate.

7. A hydromechanical final drive as set forth in claim 5, wherein said cylindrical drum is mounted on the end of said tie rod spaced from said control surface.

8. A hydromechanical final drive as set forth in claim 3, including brake means for said rotary hub located within said fixed hub support.

9. A hydromechanical final drive as set forth in claim 4, including brake means for said rotary hub located within said fixed hub support.

10. A hydromechanical final drive as set forth in claim 5, including brake means for said rotary hub located within said fixed hub support.

11. A hydromechanical final drive as set forth in claim 6, including brake means for said rotary fixed hub located within said hub support.

12. A hydromechanical final drive as set forth in claim 7, including brake means for said rotary fixed hub located within said hub support.

13. A hydromechanical final drive as set forth in claim 8, wherein said brake means includes at least one brake plate non-rotatably and axially slidably connected to said web of said planetary gear and at least one brake plate non-rotatably and axially slidably connected to said fixed hub support, and means for moving said at least one brake plate connected to said web axially to contact said at least one brake plate connected to said hub support.

14. A hydromechanical final drive as set forth in claim 1, wherein said bearing located between said fixed hub support and said rotary hub is a double-row annular ball bearing.

15. A hydromechanical final drive as set forth in claim 2, wherein said bearing located between said fixed hub support and said rotary hub is a double-row annular ball bearing.

16. A hydromechanical final drive as set forth in claim 8, wherein said bearing located between said fixed hub support and said rotary hub is a double-row annular ball bearing.

17. A hydromechanical final drive as set forth in claim 13, wherein said bearing located between said fixed hub support and said rotary hub is a double-row annular ball bearing.

* * * * *

UNITED STATES PATENT AND TRADEMARK OFFICE
CERTIFICATE OF CORRECTION

PATENT NO. : 5,391,123
DATED : February 21, 1995
INVENTOR(S) : Franz Forster

It is certified that error appears in the above-indentified patent and that said Letters Patent is hereby corrected as shown below:

Claim 11 Lines 14-15 Column 5 "rotary fixed hub located within said hub support." should read --rotary hub located within said fixed hub support.--.

Claim 12 Lines 17-18 Column 5 "rotary fixed hub located within said hub support." should read --rotary hub located within said fixed hub support.--.

Signed and Sealed this

Ninth Day of May, 1995

Attest:

BRUCE LEHMAN

Attesting Officer    Commissioner of Patents and Trademarks